United States Patent [19]

Fahrni

[11] 3,973,062
[45] Aug. 3, 1976

[54] COATING DEVICE

[75] Inventor: Fritz Fahrni, Marly, Switzerland

[73] Assignee: Ciba-Geigy AG, Basel, Switzerland

[22] Filed: Oct. 10, 1974

[21] Appl. No.: 513,891

[30] Foreign Application Priority Data

Oct. 12, 1973 Germany.................... 2351369

[52] U.S. Cl............................... 427/420; 118/325; 118/403; 118/412; 118/DIG. 4; 427/24; 427/26

[51] Int. Cl.²..................... H01F 10/00; B05C 5/02; B05C 9/06

[58] Field of Search............. 118/325, 407, DIG. 4, 118/403, 412, 324; 427/402, 420, 424, 426

[56] References Cited

UNITED STATES PATENTS

| | | | |
|---|---|---|---|
| 1,906,471 | 5/1933 | Lambacher | 118/325 |
| 1,932,727 | 10/1933 | Faulkner | 118/407 |
| 2,074,131 | 3/1937 | Penley et al. | 118/325 |
| 2,761,417 | 9/1956 | Russell et al. | 118/410 |
| 2,761,418 | 9/1956 | Russell | 118/410 |
| 2,761,419 | 9/1956 | Mercier et al. | 118/412 |
| 2,761,791 | 9/1956 | Russell | 118/410 |
| 2,932,855 | 4/1960 | Bartlett et al. | 118/412 |
| 2,975,754 | 3/1961 | Wright | 118/407 |
| 3,151,356 | 10/1964 | Senecal | 118/325 |
| 3,903,843 | 9/1975 | Jones | 118/412 |
| 3,920,862 | 11/1975 | Damschroder et al. | 427/420 |

*Primary Examiner*—Mervin Stein
*Assistant Examiner*—Douglas Salser

[57] ABSTRACT

Apparatus is provided for the simultaneous application of a plurality of layers of liquid coating compounds to an article. The apparatus and method of use thereof is, in one aspect, intended for coating a film with photographic emulsions.

18 Claims, 5 Drawing Figures

COATING DEVICE

FIELD OF THE INVENTION

This invention relates to coating apparatus and to a method of coating articles. The apparatus and method may be applied in a number of processes. It is primarily intented for the simultaneous application of several layers of emulsion to a photographic film, but it may also be used in the application of a primer and coats of paint, for example.

BACKGROUND OF THE INVENTION

It has long been known that the coating of a number of different photographic emulsions on a film, can be carried out particularly economically if all the emulsions can be applied simultaneously in one operation. A method which has become known as the cascade pouring process is carried out by means of an apparatus consisting of a number of blocks assembled to form a sloping upper surface and a body containing a longitudinal distribution duct in each block, an individual coating liquid being fed separately to each duct. The number of blocks corresponds to the number of liquids to be poured. A substantially vertical slot is provided with which each distribution duct communicates and in these slots the liquids are fed upwards by pressure from the distribution duct. At the top end the slots all open into the inclined and substantially plane surface on which the liquid flows down as a coherent uniformly distributed coating. The planes associated with the individual slots may be coplanar or be offset from one another in the region of the individual slots by small steps corresponding substantially to the thickness of the coating. In these conditions, the liquids whose exit slots are situated in the lower region of the outlet plane have the liquids emerging farther above superimposed on them with a laminar flow so that at the bottom end of the outlet surface the liquid film finally formed is built up from a plurality of sharply separated layers. This liquid film is applied either as a freely suspended meniscus or bead, or as a free-falling curtain on to the moving surface for coating. In the former case the surface for coating is spaced at a small distance from the bottom end of the outlet surface, said distance usually being only fractions of a millimetre; in the latter case, the distance is such that a free-falling curtain can form. With this apparatus it is possible without difficulty to apply three, four or even more coatings simultaneously to the surface for coating and experience has shown that if the process is properly performed the individual coatings will not mix with one another when they flow down over the inclined plane, in the freely suspended meniscus or the free-falling curtain, and on the moving surface during the subsequent drying operation.

Those versed in the art, however, are aware of the fact that the cascade pourer has a number of serious disadvantages, which become more troublesome the greater the number of superimposed liquid layers requiring to be applied in a single operation. For example, the liquid film, consisting of a plurality of layers and running over the inclined plane of the cascade pourer by gravity, is exposed to certain spontaneous disturbances which depend, in a complex manner which is not fully understood, upon the number of layers of liquid and the relationship between their thickness and viscosity. Such disturbances take the form of, for example, spontaneous corrugations perpendicularly to the direction of flow, and when the coating is applied to the base or support such corrugations remain in the form of periodic variations in emulsion thickness and have a very adverse effect on the uniformity of the coating. The probability of such corrugations occurring increases with the distance that the free-flowing film has to cover and with the thickness of the layer of liquid. For this reason, conditions become increasingly unfavourable for each additional coating.

Another very serious type of disturbance is produced by the longitudinal lines ("pencil lines") which occur in the individual emulsions and which may be due, for example, to discrete particles or air bells lodging in the vertical distribution slot associated with each coating liquid, its top edge or the outlet surface.

The strictly laminar flow pattern means that such disturbances are maintained for a long period. The transverse or longitudinal lines may even out by flow of liquid transversely thereto, but this can be expected only if the disturbed coating has a surface which is exposed to the atmosphere. In such cases the high surface tension of the liquid produces at least a partial compensation as a result of the elastic properties of the liquid surface. However, in the case of the cascade pourer, only the liquid emerging from the top slot has a free surface exposed to atmosphere. All the other coatings have the layers of liquid farther above superimposed on them immediately they emerge from the distribution slot. Although there are generally interface tensions between the individual layers of liquid, they are several orders of magnitude less than the tensions existing with respect to atmosphere and they correspond only approximately to the difference between the normal surface tensions. Consequently, all the disturbances occurring in any layer which is not situated at the surface will not even out significantly within the time available for the coating process, but will be transmitted to the support or base in their original extent. This tendency is further assisted by the fact that the differences in density of adjacent layers of liquid are generally very small so that gravity which would assist evening out is restricted to a minor value.

Calculation and experiment clearly show that any disturbance occurring in a bottom layer not immediately adjacent the free surface affects not only said layer but also the adjacent layers in sympathy. It will readily be seen that the probability for the occurrence of such faults increases in proportion with the number of layers poured simultaneously.

Another disadvantage of the prior-art cascade pourers is due to their construction. For practical reasons, the pouring apparatus is always constructed from an individual block for each layer, in which the recesses for the liquid feed, distribution ducts and exit slots are formed. These blocks are assembled by means of devices of various design, to form the complete pourer head and are retained in position by suitable supports. The strict requirements applicable to the production of photographic materials means that the construction and assembly of the pourer head must be carried out with the utmost precision. More particularly, the distribution slots must be machined very accurately since any variation in their width is cubed in its effect on the flow of the corresponding liquid. With the standard cascade pourer construction it is not possible to correct an individual slot by mechanical clamping or bending as is conventional practice with extruders, for example, because any deformation of an individual block influences the distribution slots situated on either side of it. This disadvantage of the cascade pourer also has increasing effect in proportion to the number of coatings to be poured from a single pourer head, and hence also the number of assembled blocks. Mechanical stresses which may occur if any of the blocks undergo uneven heating, also have an unfavourable effect in the same way.

Finally, the fact that the individual blocks from which a cascade pourer is made must have a minimum thickness, for mechanical reasons, also has an adverse effect. For example, after the distribution duct has been cut, a minimum material thickness must always be left to give the plate the necessary strength to resist mechanical and thermal distortion. It will readily be seen that any cascade pourer designed for the simultaneous pouring of three or more emulsions consequently has a very considerable weight, so that assembly, handling and cleaning are made difficult. At the same time, sensitivity to mechanical thermal distortion is increased disproportionately with each additional distribution plate.

The object of the invention is to provide coating apparatus in which the above disadvantages may be at least reduced.

GENERAL FEATURES OF THE INVENTION

According to the invention there is provided apparatus for the simultaneous application of at least two layers of liquid coating compounds to an article, comprising a pair of slides that extend downwardly from spaced-apart locations to a closely-spaced slot; means for supplying a layer of liquid onto each at the upper end whereby each layer may flow down its slide and through the slot, the layers being combined at the slot; and means for conveying articles to be coated along a path beneath the slot.

The number of coatings superimposed on a slide can be reduced in the arrangement according to the invention. Thus it is in turn possible to reduce the total distance which the individual coatings have to travel from exit from the feed slot to the place where they are combined, so that the coatings are less sensitive to disturbance. On the other hand, this limitation of the number of coatings superimposed on each slide means that a larger number of coatings have a surface exposed to atmosphere for part of the time required for forming the multiple coating, so that any pouring faults have the opportunity of evening out even in the case of emulsions comprising more than two coatings. The arrangement according to the invention is therefore particularly suitable for the production of photographic multilayer materials.

LIST OF DRAWINGS

For a better understanding of the invention, and to show how the same may be carried into effect, reference will now be directed, by way of example to the accompanying drawings, the four Figures of which are sectional side views of different embodiments of coating apparatus according to the invention.

DESCRIPTION OF PREFERRED EMBODIMENTS

Figure 1:
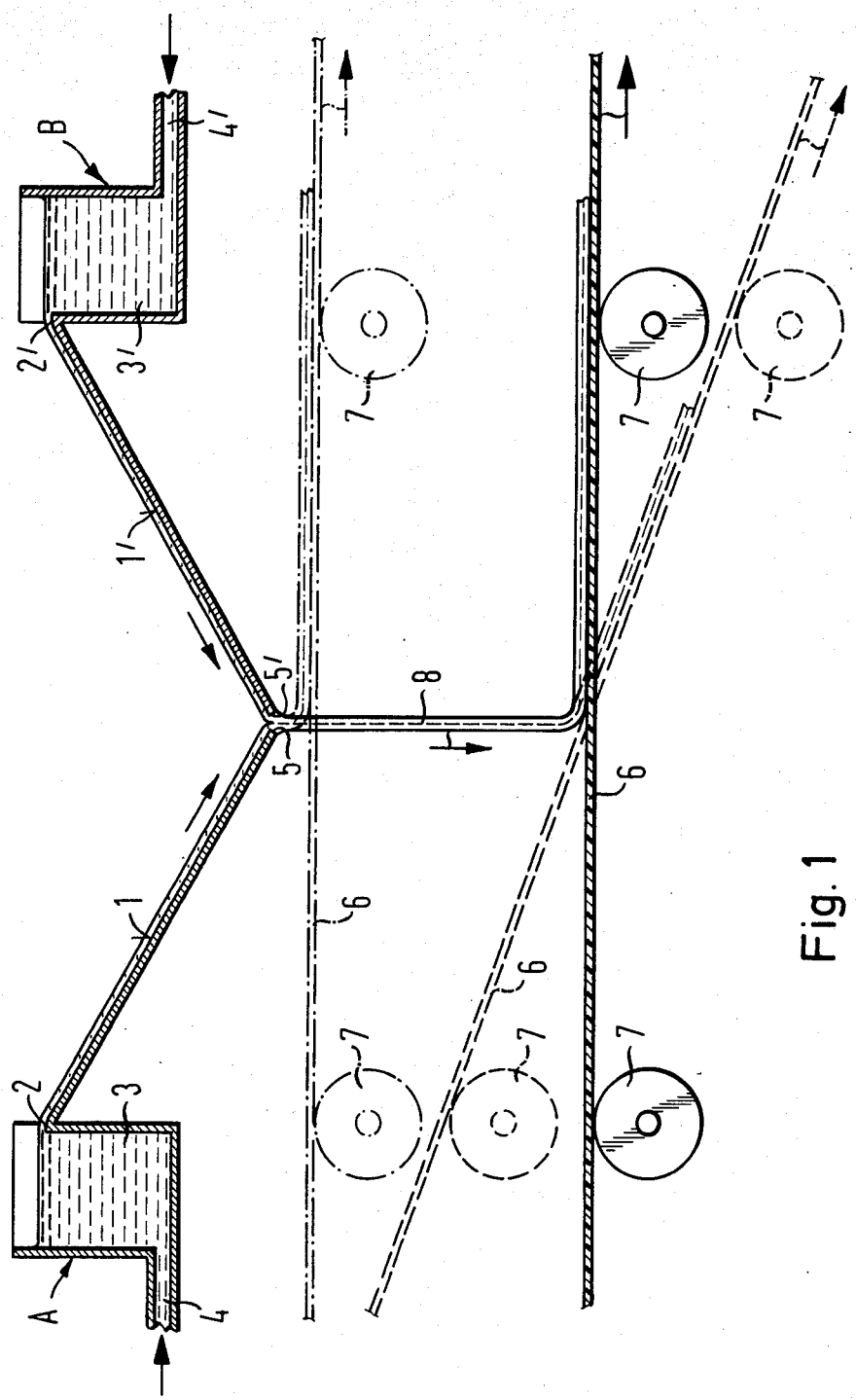

FIG. 1, shows the basic principle of the invention in its simplest form. Referring to the drawing, the pouring system comprises a pair of units A and B each having a single downwardly extending slide 1, 1' respectively.

The slides 1, 1' are fed via overflow edges or lips 2, 2' at their spaced-apart top ends from ducts 3, 3' into which lead liquid feed conduits 4, 4', respectively. The feed via an overflow edge or lip is completely equivalent to the feed via slots as shown in the following exemplified embodiments. The two slides are arranged as a V in relation to one another and terminate in parallel closely-spaced outlet lips 5, 5' respectively, forming a slot therebetween. The article requiring to be coated is conveyed beneath these outlet lips. In this case, it is in the form of a band or film strip 6 passing over two conveyor rollers 7. The article or film strip 6 to be coated may be taken horizontally (as shown in solid lines) or at an angle (shown in broken lines) at a relatively considerable distance from the two outlet lips or else pass immediately beneath the two outlet lips as shown in dot-dash lines in FIG. 1. This latter case is known as meniscus or bead pouring while the first two cases are known as curtain pouring. Only the latter will be shown in the following exemplified embodiments, but of course these systems could also be used for meniscus pouring. Also, depending upon the required emulsion sequence, the direction of the strip for coating may be from left to right or vice-versa.

The two coating compounds pass via the feed conduits 4, 4', ducts 3, 3' and overflow lips 2, 2' on to the slides 1, 1', where they flow down in the form of a thin film and join, in the region of the outlet lips 5, 5' to form a free-falling curtain 8 which drops on to the film strip 6 where it is deposited in the form of a train. Since the two films of liquid have an exposed surface for a relatively long period before they combine, any faults can even out satisfactorily during the outflow.

The following is the most advantageous procedure for forming the freely-falling curtain 8: The distance between the two outlet lips 5, 5' is so reduced that the emulsions flowing over the slides 1, 1' dam up. The distance naturally depends on the thickness of the coatings required. In a practical experiment using apparatus as shown in FIG. 1, it was about 0.5 mm. The distance between the outlet lips 5, 5' is then rapidly increased to about 1 – 1.5 mm. The instantaneous intensified flow produced as a result of the removal of the damming-up effect causes the free-falling curtain to form immediately, said curtain remaining stable after the damming-up effect has ceased. It has been found that after the stable curtain has formed the distance between the two outlet lips can be varied between 1.0 and 1.8 mm without appreciably altering the thickness of the free-falling curtain.

Figure 2:
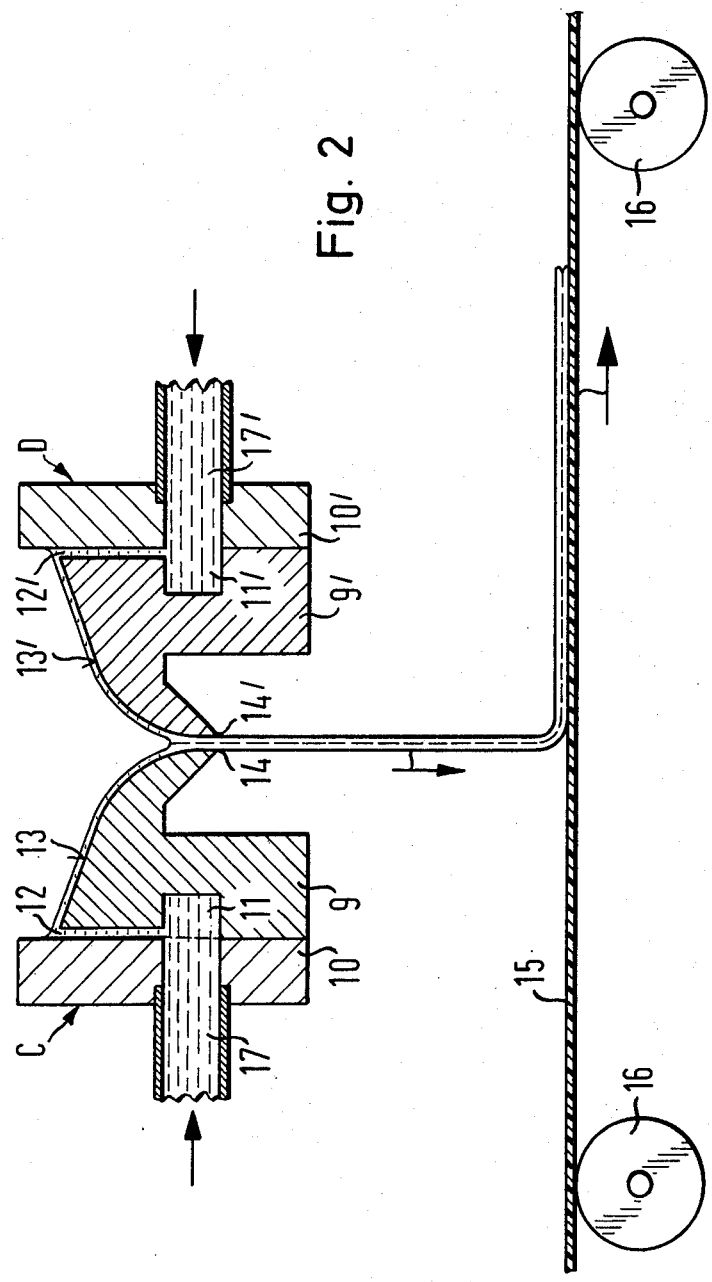

FIG. 2, shows a pouring sytem comprising two units C and D each consisting of two blocks 9, 10 and 9', 10' respectively which form between them a duct 11, 11' and a feed slot 12, 12' respectively. The tops of the blocks 9, 9' form the slides 13, 13'. As in the exemplified embodiment shown in FIG. 1, these slides are arranged in the form of a V in relation to one another and are also curved convexly in relation to one another. They terminate in parallel outlet lips 14, 14' defining a closely-spaced slot. A web 15 to be coated is passed beneath the pourer head by means of rollers 16.

The two coating compounds flow through the feed conduits 17, 17' and the blocks 10, 10' to the distributor ducts 11, 11' then via the slots 12, 12' on to the slides 13, 13'. After combining in the region of the outlet lips 14, 14' they form a free-falling two-layer curtain which is entrained by the web 15 in known manner. The distance between the two outlet lips is about 1 to 2 mm depending upon the type of curtain to be produced. The distance between the two outlet lips and the position of the individual units in relation to one another are preferably adjustable.

Figure 3:
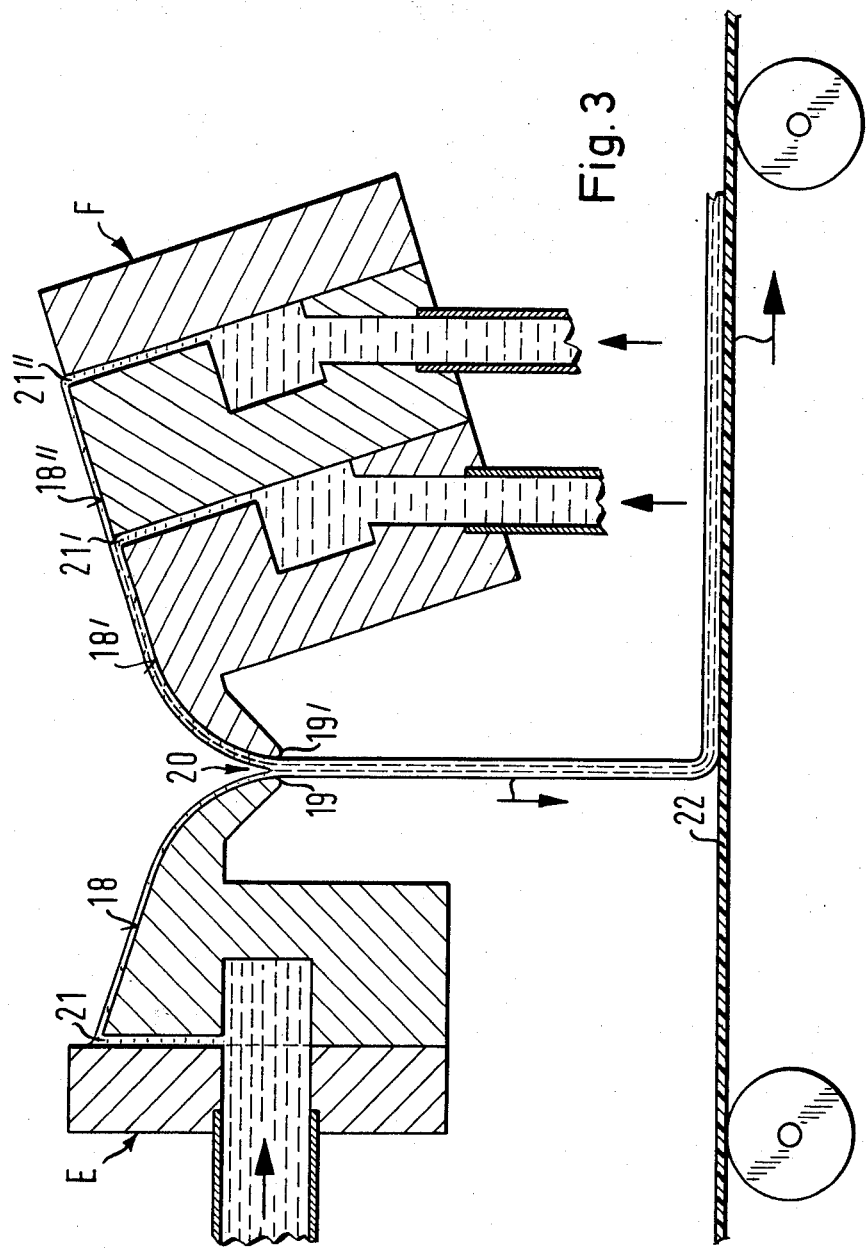

FIG. 3, shows a coating system for a triple emulsion. With this system, unlike a conventional three-coating cascade the inner coating, i.e. the middle of the three coatings, has an exposed surface over a certain distance before it is combined with the other coatings. Referring to the drawing, the apparatus comprises two units E and F, of which unit F is constructed as a two-coating cascade. The slide 18 of unit E and the bottom slide 18' of the cascade F are arranged in the form of V in relation to one another and their outlet lips 19, 19' form between them a slot 20, the width of which is about 1.5 to 3 mm. The position of the two units E and F in relation to one another is again preferably adjustable. The three-coating liquid curtain is again produced by combining the three coatings flowing over the individual slides 18, 18', 18'', and then deposited in known manner on the support 22 requiring to be coated.

Figure 4:
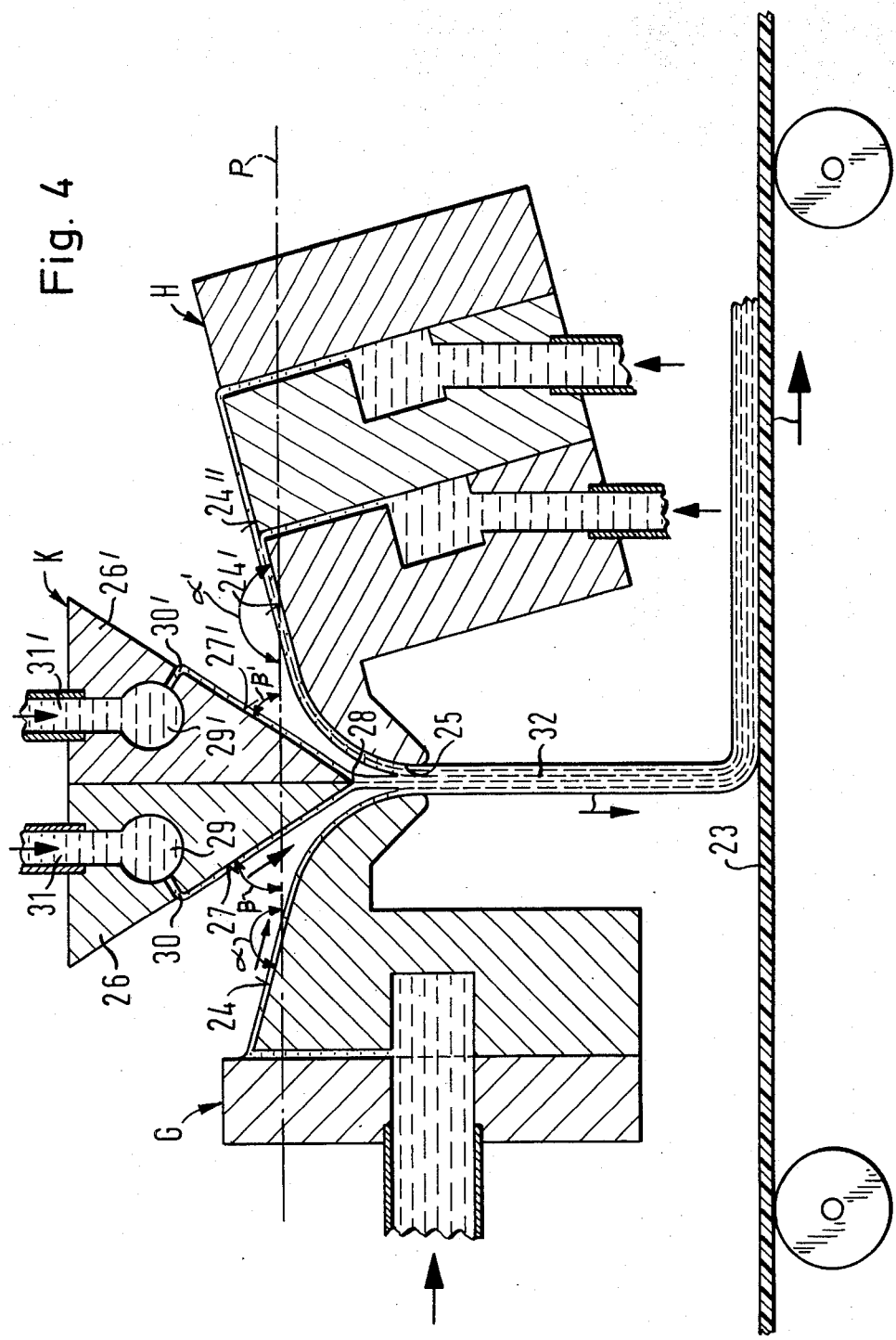

FIG. 4, shows an apparatus for the simultaneous application of five different emulsions to an article 23 in the form of a strip. The apparatus comprises three units G, H and K. The construction and relative arrangement of the units G and H are substantially the same as those of the units E and F of FIG. 3, except that the slot 25 formed between their bottom slides 24, 24' is wider to correspond to the larger number of emulsions. Unit K consists of two blocks 26, 26' having a right-angled triangle cross-section. The hypotenuse surfaces of the two blocks form the slides, 27, 27'. As will be seen from the drawing, the slides are arranged in the form of V in relation to one another and are inclined with an overhang to the vertical. The two slides terminate in a common outlet lip 28, the blocks being so disposed in relation to the two units G and H that the outlet lip is closely spaced above the flow gap 25. Each of the two blocks 26, 26' contains a distributor duct 29, 29' and a feed slot 30, 30' leading into the slide 27, 27' respectively. The coating compounds pass via feed conduits 31, 31' into the distributor ducts 29, 29' and then via the feed slots 30, 30' on to the slides 27, 27' where they flow in the form of a thin film, combine into a double coating at the outlet lip 28 and then drop into the slot between the single coating flowing away from the slide 24 of unit G and the double coating flowing away from the slide 24' of cascade H, and then combine to form a five-coating emulsion dropping in the form of a free-falling curtain 32 on to the film 23 to be coated. In this exemplified embodiment also, the relative positions of the individual units are preferably adjustable.

As will readily be apparent from FIG. 4, four of the five coatings in this arrangement have an exposed surface before they are combined so that any faults can even out satisfactorily. In a conventional five-layer cascade all the coatings would flow on to one another so that only the top coating would have a free surface and in practice this would prevent recovery. Thus with the apparatus shown in FIG. 4, it is possible a five-coating emulsion in a single operation with much fewer pouring faults than, say, with a conventional five-coating cascade.

Figure 5:
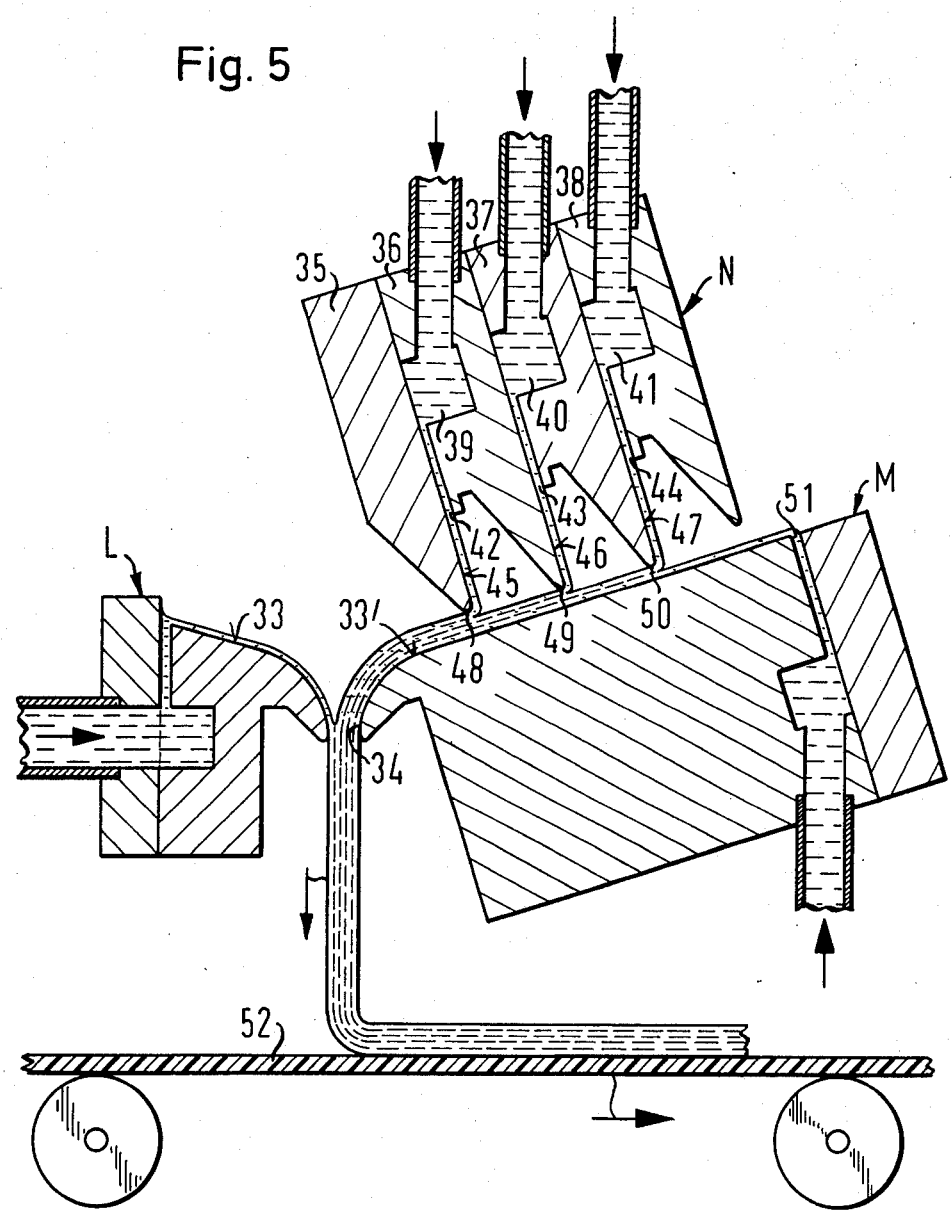

FIG. 5, shows another variant of pouring apparatus which is also designed for five-coatings and is divided up into three units L, M and N. Each of the two units L and M is provided with a feed slot and a slide 33, 33', unit L again being equivalent to unit E in FIG. 3, and unit M differing only in that it has a much longer slide 33'. The slides of the units L and M are again arranged in the form of a V in relation to one another and terminate in parallel outlet lips which form a slot 34 between them. Unit N is disposed above unit M and consists of four blocks 35, 36, 37 and 38 each forming a distributor duct 39, 40 and 41 and a feed slot 42, 43, 44 respectively between them. One boundary wall of each of the feed slots merges flush into a slide 45, 46 and 47 which each terminate in an outlet lip 48, 49 and 50. The slides are arranged parallel to one another and are at right angles to the slide 33' of unit M. The outlet lips 48, 49 and 50 are parallel both to one another and to slide 33' and are closely spaced from the slide 33'. The distance between the outlet lip 48 of the bottom slide 45 of unit N and the slide 33' of unit M is about 0.5 to 1 mm per slot situated upstream of the outlet lip, i.e. the slots 42, 43 44 of unit N and slot 51, of unit M, and is therefore about 2 to 4 mm. The distance between the other outlet lips 49 and 50 is less to correspond to the small number of slots situated upstream thereof. The relative positions of the three units are again adjustable in this variant of the apparatus.

Unit N produces three individual coatings which have an exposed surface in the region of the slides 45, 46 and 47 so that any faults can even out satisfactorily. These three coatings are deposited on to the coating flowing over the slide 33' of unit M so that they finally combine to form a quadruple coating. In the region of the flow gap 34 between the slides 33 and 33' of the two units L and M, the quadruple coating combines with the single coating coming from unit L, to form a five-coating curtain which is then conventionally deposited on the support 52 for coating. This variant of the apparatus also gives considerable improvements in the quality of the multiple emulsion as compared with a hitherto conventional five-coating cascade.

In all the exemplified embodiments the individual units are preferably secured interchangeably in a frame (not shown). Means (not shown) are provided for adjustment of the units in such a manner that at least the distance between each pair of cooperating slides of different units is adjustable, and the same applies preferably also to the inclination of units and their slides.

The division into a number of units or cascades also has the advantage that the entire apparatus is mechanically simpler and less demanding in respect of precision, since the tolerances do not add up to an unacceptable total tolerance in this way.

We claim:
1. Apparatus for the simultaneous application of at least two layers of liquid coating compounds to an article, comprising a pair of slides that extend downwardly from spaced-apart locations to define a closely spaced combining slot between their lower ends;
   means for supplying a layer of liquid onto each slide at the upper end whereby each layer may flow down its slide through the combining slot, the layers being combined at the combining slot; and
   means for conveying articles to be coated beneath the combining slot.

2. Apparatus according to claim 1, comprising a pair of blocks, each having a surface constituting one of said slides, each block being shaped to provide a conduit forming said supplying means, and means for adjusting each block with respect to the other block.

3. Apparatus according to claim 1, comprising four blocks, each having a surface constituting one of said slides, of which there are two pairs, the blocks being mounted in such a way that one slide of each pair is at an acute angle to the horizontal and the other is at an acute angle, the blocks having the obtuse angled slides being secured together back-to-back to define a downwardly-extending knife edge at which the lower ends of the slides meet, the blocks having the obtuse angled slides being mounted close to said knife edge to define a pair of combining slots on either side thereof.

4. Apparatus according to claim 1, comprising more than two slides, the combining slot of one pair of slides constituting the supplying means for one slide of another pair.

5. Apparatus according to claim 1, comprising at least three blocks, one of which has a surface that constitutes one slide of each pair of slides in co-planar relation, each other block having a surface that constitutes the other slide of each pair, the blocks being mounted so that said other blocks are arranged with their lower edges forming said combining slots at intervals down the surface of said one block.

6. Apparatus according to claim 5, including a further block mounted with its lower edge forming a combining slot with the lower edge of said one block.

7. Apparatus according to claim 2, wherein an additional block is secured to at least one of said blocks, said additional block having a surface forming a slide having its lower edge adjacent the upper edge of said block, the additional block being shaped to provide a conduit forming means for supplying a layer of liquid onto the slide at its upper end whereby the layer may flow down the slide and be superimposed on the layer provided by the conduit of said lower block.

8. Apparatus according to claim 7, in which the direction of movement of said means for conveying articles beneath the combining slot is such as to locate the layer from said additional block beneath the layer formed on said block, when on said article.

9. Apparatus as claimed in claim 1, in which each slide is convexly curved at its lower end.

10. Apparatus according to claim 1 and further comprising a third slide positioned above said combining slot with its outlet lip parallel to and closely spaced above said combining slot, and means for supplying a layer of liquid onto said third slide at the upper end thereof.

11. Apparatus according to claim 1 and further comprising a third slide positioned above one slide of said pair of slides with its outlet lip parallel to and closely spaced above said one slide, and means for supplying a layer of liquid onto said third slide at the upper end thereof.

12. Apparatus according to claim 11 and further comprising a fourth slide positioned above one slide of said pair of slides with its outlet lip parallel to and closely spaced above said one slide, and means for supplying a layer of liquid onto said fourth slide at the upper end thereof.

13. Apparatus according to claim 1 and further comprising a third slide positioned above said combining slot with its outlet lip parallel to and closely spaced above said combining slot, and a fourth slide positioned above one slide of said pair of slides with its outlet lip parallel and closely spaced above said one slide, and means for supplying a layer of liquid onto each of said third and said fourth slides at the upper end thereof.

14. Apparatus according to claim 13 and further comprising a fifth slide positioned above one slide of said pair of slides with its outlet lip parallel to and closely spaced above said one slide, and means for supplying a layer of liquid onto said fifth slide at the upper end thereof.

15. Apparatus according to claim 10 and further comprising a fourth slide forming together with the third slide a V-shaped configuration wherein the lower end of said fourth slide intersects said third slide at its outlet lip so as to form a common outlet lip for said third and said fourth slides and means for supplying a layer of liquid onto said fourth slide at the upper end thereof.

16. A method for the simultaneous application of at least two layers of liquid coating compounds to an article, comprising the steps of:
supplying a layer of liquid to the upper end of a pair of slides that extend downwardly from spaced-apart locations to define a closely-spaced combining slot at their lower ends;
allowing the layers to flow down the slides and through the slot;
combining the layers as they flow through the combining slot; and
conveying articles to be coated along a path beneath the combining slot.

17. A method according to claim 16, including the step the coating is applied to the article by the bead method.

18. A method according to claim 16, including the steps of reducing the spacing of the combining slot to dam the flow of the liquid, quickly increasing the spacing to allow the liquid to drop as a curtain onto the article, and moving the article along said path to entrain the curtain and apply the coating.

* * * * *